United States Patent [19]
Harvey

[11] Patent Number: 5,102,040
[45] Date of Patent: Apr. 7, 1992

[54] METHOD AND APPARATUS FOR FAN CONTROL TO ACHIEVE ENHANCED COOLING

[75] Inventor: William J. Harvey, Lisle, Ill.

[73] Assignee: AT&T Bell Laboratories, Murray Hill, N.J.

[21] Appl. No.: 678,555

[22] Filed: Mar. 28, 1991

[51] Int. Cl.$^5$ .............................................. F24F 7/00
[52] U.S. Cl. .......................... 236/49.3; 236/DIG. 9; 165/40; 361/384
[58] Field of Search ................ 236/49.3, 94, DIG. 9; 165/80.2, 80.3, 40, 11 R; 416/44; 417/22, 19, 32, 14, 292; 364/382, 383, 384, 385

[56] References Cited

U.S. PATENT DOCUMENTS

| | | | |
|---|---|---|---|
| 4,126,269 | 11/1978 | Bruges | 236/49.3 |
| 4,352,349 | 10/1982 | Yoho | 236/DIG. 9 |
| 4,659,290 | 5/1987 | Kundert | 417/32 |
| 4,667,480 | 5/1987 | Bessler | 417/32 X |
| 4,722,669 | 2/1988 | Kundert | 236/DIG. 9 |
| 4,756,473 | 7/1988 | Takemae et al. | 236/49.3 |

OTHER PUBLICATIONS

Control Resources, Inc., sales catalog (date unknown).

Cambridge Aeroflo Inc., Application Notes, Airflow Switches Series, 300, Apr. 1988.

"Trends in Electronic Hardware & the Importance of Precision Temperature Measurement", S. Madhavan, I&CS, Jun. 1989.

Primary Examiner—Harry B. Tanner
Assistant Examiner—John Sollecito
Attorney, Agent, or Firm—Robert B. Levy

[57] ABSTRACT

Enhanced cooling of electronic equipment (14) within an enclosure (10) is obtained by prescribing the relationship between the maximum allowable temperature difference $\Delta T_m$ between the exhaust and inlet air temperatures $T_e$ and $T_i$ versus the actual inlet temperature. Once a relationship between the maximum allowable temperature difference $\Delta T_m$ versus inlet temperature $T_i$ has been established, then each fan (22) which draws air through the enclosure is controlled so that the fan's speed is increased when the actual temperature $\Delta T$ exceeds the maximum allowable temperature difference $\Delta T_m$ by a predetermined tolerance factor. In this way, factors such as increased heat load in the enclosure (10), diminution of the air flow therethrough, as well as an increase in the inlet air temperature, are taken account of in the control of fan speed.

8 Claims, 2 Drawing Sheets

METHOD AND APPARATUS FOR FAN CONTROL TO ACHIEVE ENHANCED COOLING

TECHNICAL FIELD

This invention relates to a method, and associated apparatus, for controlling one or more fans within an electronics enclosure to achieve enhanced cooling and cooling control.

BACKGROUND OF THE INVENTION

Electronic equipment housed within an enclosure is often cooled by one or more fans which are operated to draw or blow air through the enclosure past the equipment therein. In the past, the fan(s) within such enclosures were usually operated at their rated speed (RPM) at all times, the rated speed being selected to assure sufficient air flow to avoid overheating under worst-case conditions. Operating the fan(s) at their rated speed at all times is inefficient and wasteful of energy because worst-case conditions infrequently occur. Moreover, fan operation at full speed is usually accompanied by a high noise factor, which is generally undesirable.

In an effort to avoid the above-enumerated disadvantages, controllers have been developed for varying the fan speed (RPM). Present day fan controllers generally operate to vary the fan speed continuously, or between a low and a high speed, either in accordance with the temperature of the air entering the enclosure ($T_i$), or the temperature ($T_e$) of the air leaving the enclosure, or with the temperature difference $\Delta T$ between $T_e$ and $T_i$. Under normal operating conditions, each of these approaches accomplishes reduced fan speed under normal operating conditions, thereby lowering energy consumption and fan noise.

Variable fan-speed operation in accordance with each of these approaches, while preferable to fixed-speed fan operation, nonetheless incurs difficulties. For example, varying the fan speed in accordance with the air inlet temperature $T_i$ does not account for any diminution in the volume of air drawn through the enclosure as a result of a clogged fan filter or a blocked air inlet. In addition, regulating the fan speed in accordance with $T_i$ does not account for any increase in heat load, due to an increase in amount of electronic equipment within the enclosure or a fan failure.

By comparison, varying the fan speed in accordance with $\Delta T$ or $T_e$ does account for a diminished air flow, as well as an increased heat load. However, varying the fan speed in accordance with $\Delta T$ does not take into account an increase in the value of the inlet air temperature $T_i$. As the inlet air temperature $T_i$ rises, it is possible that $\Delta T$ may not increase. However as the inlet air temperature rises, the temperature of the electronics within the enclosure may likewise rise, giving rise for a need for greater cooling. However, if the fan speed is regulated in accordance with the actual value of $\Delta T$, the fan speed will not change. Under these circumstances, electronic equipment overheating may occur. The disadvantage to controlling the fan speed in accordance with the air exhaust temperature $T_e$ is that the technique provides no indication as to what conditions may have changed. For example, controlling the fan speed in accordance with $T_e$ would not indicate whether the increase in heat load was due to a blocked fan, an increase in the amount of electronics, etc.

Thus, there is a need for a technique for varying the fan speed which accounts for changes in both $T_i$ and $\Delta T$ to achieve enhanced cooling and control.

SUMMARY OF THE INVENTION

Briefly, in accordance with a preferred embodiment of the invention, a method is disclosed for controlling the speed of at least one fan forcing air through an enclosure containing heat-generating equipment to enhance the cooling of such equipment. The method is initiated by first establishing a relationship between the temperature of air entering the enclosure ($T_i$), and the maximum allowable temperature difference $\Delta T$ for the equipment. As the heat-generating equipment within the enclosure is operated, both the inlet and exhaust temperature $T_i$ and $T_e$ are continuously measured. The difference between the actual value of $\Delta T$ and the maximum allowable value of $\Delta T$, as determined from the prescribed relationship between the maximum allowable $\Delta T$ and $T_i$, is determined. The speed of the fan(s) in the enclosure is adjusted such that the actual value of $\Delta T$ does not exceed the maximum allowable value of $\Delta T$ by more than a predetermined tolerance factor. The foregoing approach advantageously accounts for both a diminution of air flow and increased heat volume as well as an increase in the ambient air temperature.

DETAILED DESCRIPTION

Figure 1:
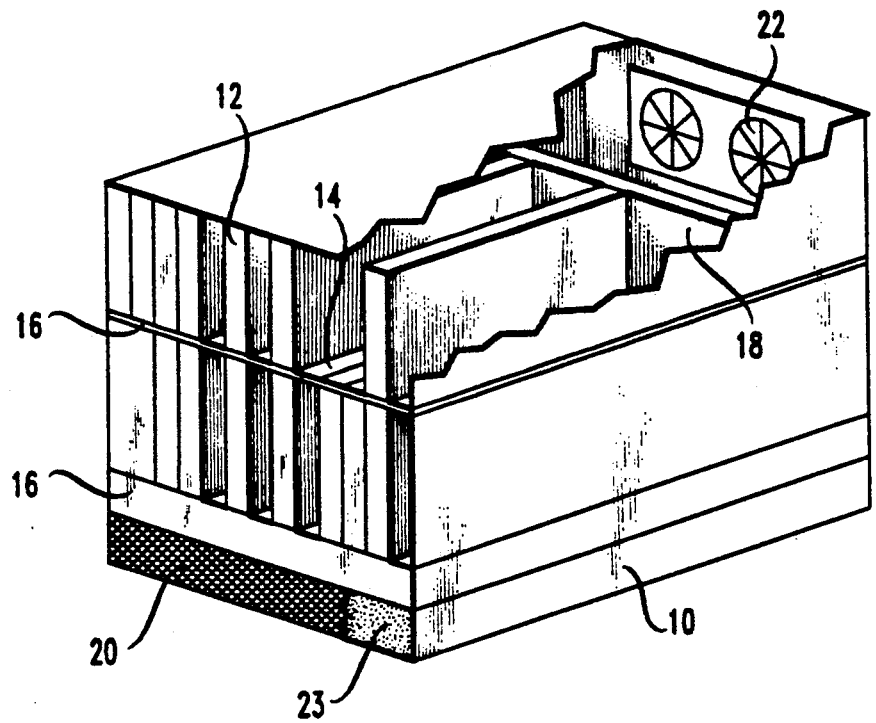
FIG. 1 is a partially cut-away view in perspective of an enclosure according to the prior art which contains at least one fan for forcing air through the enclosure to cool equipment contained therein.

FIG. 1 is a partially cut-away perspective view of a prior art enclosure 10 which is adapted to hold one or more pieces of electronic equipment 12. In a preferred embodiment, each piece of electronic equipment takes the form of a plug-in card 12 comprised of a component-carrying circuit board (not shown). Each card 12 is adapted to slide along, and seat in, a separate one of a set of slots or channels 14 within a set of shelves 16 secured in the enclosure 10. As each plug-in card 12 is inserted in its respective channel 14, the card makes electrical contact a backplane 18 which serves to selectively connect the card to others within the enclosure 10.

The plug-in cards 12, when operated, generate heat, which in the aggregate can be significant. If the heat generated by the plug-in cards 12 was allowed to remain trapped in the enclosure 10, one or more of the plug-in cards could become overheated and cease operating. To avoid overheating of the plug-in cards 12, air is forced through the enclosure to provide cooling. To this end, an air inlet/outlet 20 is provided into the enclosure, typically in the front thereof near the base where the air is coolest. One or more fans 22 are typically mounted in the back wall of the enclosure to draw air from the inlet 20 through the enclosure 10. An air filter 23 is provided within the inlet 20 to filter the air drawn through, and then exhausted from, the enclosure by the fans 22.

Generally speaking, the heat q within the enclosure 10 is constant and is proportional to the product of the air flow through the enclosure 10 and the temperature difference $\Delta T$ between the air temperature $T_i$ at the inlet 20 and the temperature $T_e$ of the air exhausted by the fans 22. The air flow through the enclosure 10 varies with the speed of the fans 22 so that as the fan speed increases, so does the air flow. In the past, the fans 22 within the enclosure were operated continuously at their rated speeds so the fans could move sufficient air for worst-case conditions. Constant operation of the fans 22 at their rated speed at normal conditions is wasteful of energy. Moreover, continuous operation of the fans 22 at their rated speed often creates a large amount of unwanted noise.

Figure 2:
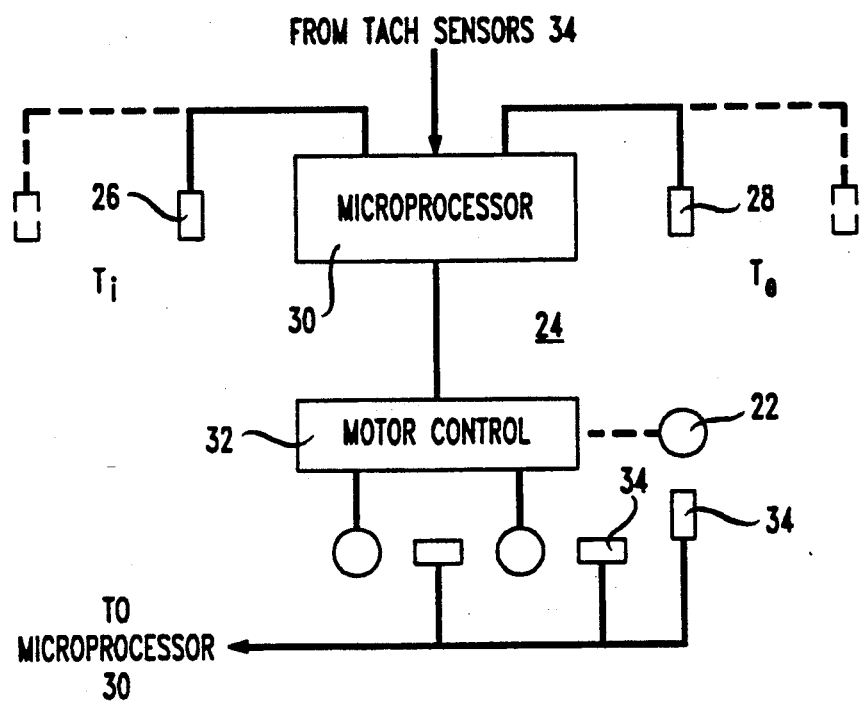
FIG. 2 is a block diagram of a system, in accordance with the present invention, for varying the speed of the fans of FIG. 1 in accordance with both the inlet air temperature and $\Delta T$, the difference between the inlet and exhaust air temperatures.

In FIG. 2, there is shown a block schematic diagram of a control system 24, in accordance with the invention, for controlling the fans 22 to vary their speed in accordance with both the air temperature $T_i$ at the inlet 20 and the temperature difference ($\Delta T$) between $T_e$ and $T_i$. The fan control system 24 comprises at least one temperature-sensing device 26 (e.g., a thermistor or the like) positioned adjacent to the air inlet 20 of FIG. 1 for sensing the inlet air temperature $T_i$. At least one temperature sensing device 28, of a construction similar to the temperature sensor 26, is positioned within the stream of air exhausted by the fans 28 to measure the exhaust air temperature $T_e$. As indicated by the dashed lines in FIG. 2, additional temperature sensors 26 and 28 may be provided for measuring the inlet and exhaust air temperature $T_i$ and $T_e$ at different locations within the inlet 20 and the exhaust air stream, respectively.

The inlet and exhaust temperature sensors 26 and 28 are coupled to a microprocessor 30 which processes the signals from the sensors to establish the inlet and exhaust air temperatures $T_i$ and $T_e$. (In the case of multiple inlet and exhaust temperature sensors 26 and 28, the microprocessor 30 will average the signals received from the inlet and exhaust temperature sensors 26 and 28 to obtain a more accurate measure of inlet and exhaust air temperatures $T_i$ and $T_e$, respectively.) The microprocessor 30 is programmed, in the manner described below, to generate a fan control signal in accordance with the difference between $\Delta T$, the actual temperature difference between $T_e$ and $T_i$, and $\Delta T_m$, the maximum allowable temperature difference between $T_e$ and $T_i$ for the current value of the inlet air temperature $T_i$. The fan control signal produced by the microprocessor 30 is output to a motor control unit which excites the fans 22 in accordance with the fan control signal to adjust the fan speed in accordance with the difference between $\Delta T$ and $\Delta T_m$.

Figure 3:
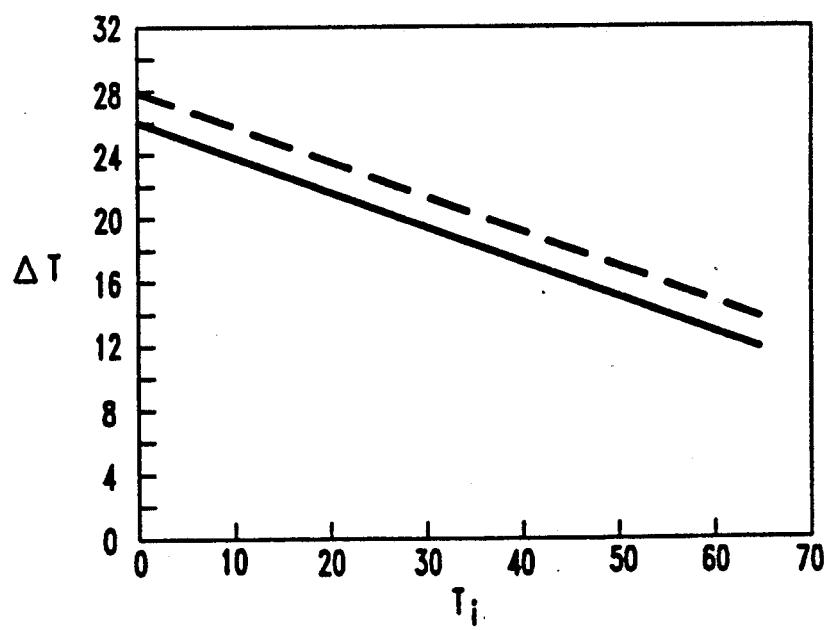
FIG. 3 is graphical representation of the maximum allowable temperature differential between the inlet and exhaust air temperatures versus inlet air temperature for the enclosure of FIG. 1.

The manner in which the microprocessor 30 controls the speed of the fans 22 may best be understood by reference to FIG. 3, in which the solid line represents the graphical relationship between the maximum allowable temperature difference $\Delta T_m$ versus inlet temperature $T_i$ for the enclosure of FIG. 1. The actual temperature difference ($\Delta T$) between $T_i$ and $T_e$ corresponds to the heat being dissipated within the enclosure 10 and the air flow therethrough. Obviously, if the temperature difference in the enclosure 10 becomes too great, then overheating of the plug-in cards 12 will occur. Thus, for the plug-in cards 12, there is a maximum temperature difference ($\Delta T_m$) that can be tolerated.

Simply adjusting the speed of the fans 22 to maintain a constant $\Delta T$ will not avoid overheating of the plug-in cards 14 of FIG. 1 because as the inlet air temperature $T_i$ increases, the maximum temperature difference ($\Delta T_m$) that can be tolerated decreases. The reason why is that as the inlet air temperature $T_i$ rises, the degree to which the plug-in cards 12 of FIG. 1 will be cooled by this higher temperature air is accordingly reduced. The relationship between the maximum allowable temperature difference $\Delta T_m$ and the inlet air temperature $T_i$ depends on the cooling requirements for the particular configuration and number of plug-in cards 12 in the enclosure of FIG. 1. For the enclosure 10 of the preferred embodiment, the relationship between the maximum allowable $\Delta T_m$ and $T_i$ is given by the formula $$\Delta T_m = C_1 T_i + C_2 \qquad (1)$$

where $C_1$ and $C_2$ are constants depending on the nature of the plug-in cards 12 and the conditions under which they are being operated. The relationship between $\Delta T_m$ and $T_i$ given by eq. (1) for the enclosure of FIG. 1 is represented by the solid line in the plot of FIG. 3. A different electronic enclosure having a different configuration of electronic equipment will likely have different cooling requirements, and, therefore, the values of $C_1$ and $C_2$ will be different. Accordingly, the relationship between the maximum allowable value of $\Delta T_m$ versus $T_i$ for such an enclosure will be different from that shown in FIG. 3.

Control of the fans 22 by the microprocessor 30 in accordance with the invention is accomplished by first establishing the desired relationship between the maximum allowable value of $\Delta T_m$ versus $T_i$ and then entering the relationship into the microprocessor at the outset of operation. There are several ways in which this can be done. For example, eq. (1) can be entered directly. Thus, during operation, the maximum allowable value of $\Delta T_m$ for the currently measured value of $T_i$ must be calculated using the $T_i$ value obtained from the sensor(s) 26. Alternatively, a look-up table containing corresponding values of the maximum allowable $\Delta T_m$ for each of a plurality of possible values of $T_i$ can be entered. Thus for a given measured value of $T_i$, the corresponding maximum allowable value of $\Delta T_m$ can easily be obtained from the previously entered look-up table.

Once the desired relationship between $\Delta T_m$ and $T_i$ has been entered into the microprocessor 30, then actual control of the fans 22 is commenced, when the plug-in cards 12 of FIG. 1 are initially energized, by initially energizing the fans so that they operate at minimal rate, typically about one-half their rated speed. As the fans 22 operate, the inlet and exhaust air temperatures $T_i$ and $T_e$ are monitored by the microprocessor 30 by sensing the signals from the sensors 26 and 28, respectively. The actual value of $\Delta T$ is then calculated and compared to the maximum allowable (i.e., prescribed) value of $\Delta T_m$ given by the previously entered relationship between $\Delta T_m$ and $T_i$, as shown in FIG. 3.

If the actual value of $\Delta T$ exceeds $\Delta T_m$ by more than a predetermined tolerance factor, typically 4° C. (represented by the dashed line in FIG. 3), then the microprocessor 30 signals the motor control 32 to increase the speed of the fans 22. By increasing the fan speed, the air flow in the enclosure 10 increases, thereby increasing the cooling of the plug-in cards 12 of FIG. 1 which reduces the temperature difference $\Delta T$.

The steps of sensing $T_i$ and $T_e$, calculating the actual value of $\Delta T$, comparing the actual value to the value of $\Delta T_m$, and increasing the fan speed if the value of $\Delta T_m$ exceeds the actual value of $\Delta T$, are carried out periodically at a very rapid rate, typically once every few microseconds. In this way, the fan speed will be automatically increased, very rapidly, as the actual value of $\Delta T$ rises above the value of $\Delta T_m$ corresponding to the current value of $T_i$.

Controlling the fan speed in the manner described has several distinct advantages over prior art schemes because the present approach not only advantageously accounts for an increase in heat load as well as a diminution of air flow, but also accounts an increase in the inlet temperature $T_i$. If the heat load within the enclosure 10 increases, for example, as a result of an increase in the number of plug-in cards 12, or if the air flow is diminished, as a result of the inlet 20 of FIG. 1 becoming blocked or the air filter 23 becoming clogged, then the actual value of $\Delta T$ will increase. An increase in the actual value of $\Delta T$ causes the difference between $\Delta T$ and $\Delta T_m$ to increase. Consequently, the microprocesor 30 causes the speed of the fans 22 to increase which increases the air flow into the enclosure 10, thereby reducing the temperature therein.

Should the air inlet temperature increase $T_i$ rise, then given the relationship between $\Delta T_m$ and $T_i$ shown by the solid line in FIG. 3, $\Delta T_m$ will decrease. If the actual value of $\Delta T$ remains unchanged, or changes less than $\Delta T_m$ as a result of the rise in $T_i$, then the microprocessor 30 will also increase the fan speed.

Figure 4:
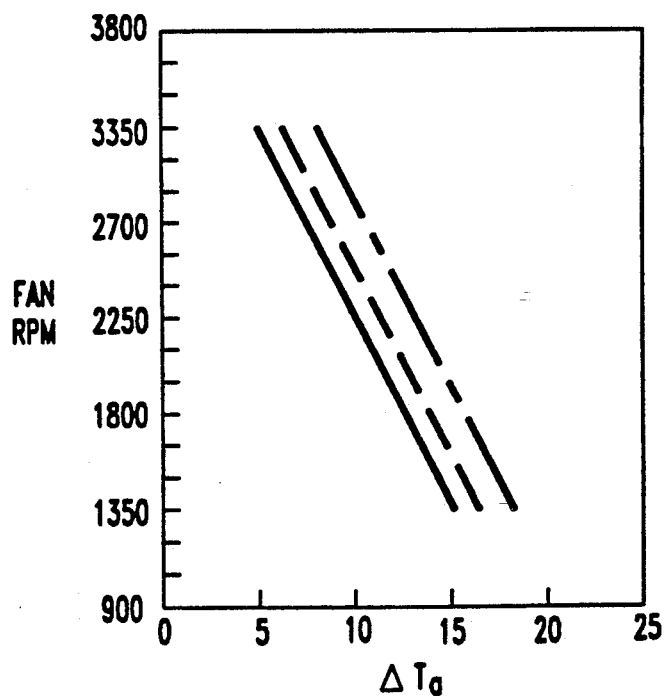
FIG. 4 is a graphical representation of the fan speed versus temperature differential for the fans of FIG. 1.

As should be appreciated, it is not possible to continually increase the speed of the fans 22 in response to an increase between $\Delta T$ and $\Delta T_m$. Eventually, the fans 22 will reach their rated speed beyond which continuous higher speed operation cannot be sustained. At their rated speed (typically 3350 RPM), the fans 22 can only circulate enough air to achieve a particular $\Delta T$ which may be greater (or less) than $\Delta T_m$ for the corresponding present value of $T_i$. Likewise, when the fans 22 are operated at their minimum speed (about 1350 RPM), the air flow achievable at that fan speed will be sufficient to achieve an actual $\Delta T$ which may be greater or less than $\Delta T_m$ for that speed. FIG. 4 shows the relationship between the speed (RPM) of the fans 22 and $\Delta T_a$, the minimum achievable value of $\Delta T$ for that fan speed. The solid line in FIG. 4 represents the relationship between fan speed (RPM) and $\Delta T_a$ achievable at sea level, assuming the air filter 23 within the inlet 20 is clean. The dashed line represents the relationship between the fan speed and $\Delta T_a$ which is achievable at an altitude of 10,000 feet, also assuming a clean filter 23. The dash-dotted line in FIG. 4 represents an alarm condition which occurs when the actual value of $\Delta T$ exceeds the value of $\Delta T_a$ for the corresponding fan speed. As with the relationship between $\Delta T_m$ and $T_i$, the relationship between $\Delta T_a$ and fan speed, given by the dash-dotted line in FIG. 4, is entered to the memory of the microprocessor 30 at the outset of operation.

To be able to sense the alarm condition shown in FIG. 4, each of the fans 22 of FIG. 2 has a tachometer sensor 34 associated with it for monitoring the fan's speed. The tachometer sensor 34 associated with each fan 22 is coupled to the microprocessor 30 which continuously monitors the actual fan speed along with the inlet and exhaust air temperature $T_i$ and $T_e$, respectively. Should the actual value of $\Delta T$ exceed the alarm limit value of $\Delta T_a$, given by the dash-dotted line in FIG. 4, then such a condition is reported.

Further, by sensing the speed of the fans 22, the microprocessor 30 can ascertain clogging of the air filter 23 within the inlet. As clogging begins, $\Delta T$ will remain constant at a constant temperature $T_i$ but the fan speed will increase. Should the fan speed increase above a predetermined limit, then the filter 21 is likely clogged and such a condition is reported. Also, by sensing the speed of each of the fans 22, a blockage or failure of any individual fan can also be discerned.

The foregoing describes a technique for controlling the speed of a set of fans (22) cooling an electronics enclosure 10 in accordance with the difference between the actual temperature difference $\Delta T$ and the maximum allowable temperature difference value $\Delta T_m$ for the current value of $T_i$.

It is to be understood that the above-described embodiments are merely illustrative of the principles of the invention. Various modifications and changes may be made thereto by those skilled in the art which will embody the principles of the invention and fall within the spirit and scope thereof. For example, the fan control technique of the invention is applicable for any type of enclosure, not just the enclosure 10, and may be employed to control either a single fan 22, or a multiple set of fans.

I claim:

1. A method for controlling the speed of at least one fan which forces air through an enclosure to enhance the cooling of equipment within the enclosure, comprising the steps of:
   (a) prescribing a relationship between the maximum allowable difference ($\Delta T_m$) between the temperature of air entering the enclosure ($T_i$) and the temperature of air exhausted from the enclosure ($T_e$) for a given value of $T_i$;
   (b) monitoring both $T_i$ and $T_e$;
   (c) determining the difference between the actual value of $\Delta T$ and the maximum allowable value of $\Delta T_m$ corresponding to the actual value of $T_i$; and
   (d) increasing the speed of the fan when the actual value of $\Delta T$ exceeds the maximum allowable value of $\Delta T_m$ by more than a predetermined tolerance factor.

2. The method according to claim 1 wherein the steps of (b)–(d) are repeatedly executed at a rapid rate.

3. The method according to claim 1 including the steps of:
   (a) prescribing a relationship between the fan speed and the maximum allowable temperature difference $\Delta T_m$;
   (b) monitoring the fan speed;
   (c) determining the maximum allowable temperature difference $\Delta T$ corresponding to the actual fan speed;
   (d) comparing the maximum allowable temperature difference $\Delta T_m$ corresponding to the actual fan speed to the actual temperature difference $\Delta T$ and signaling an alarm condition if the maximum allowable $\Delta T_m$ exceeds the actual $\Delta T$ by more than a predetermined tolerance.

4. The method according to claim 3 wherein the steps of (b)–(d) are performed repeatedly at a high rate.

5. The method according to claim 3 including the steps of:

(a) detecting if the fan speed increases while the actual value of $\Delta T$ remains substantially constant; and, if so (b) signaling a change in such fan speed.

6. A fan controller for controlling at least one fan drawing air through an enclosure containing at least one piece of heat-generating equipment therein to enhance the cooling of such equipment, comprising;

first temperature-sensing means for sensing the temperature ($T_i$) of air entering the inlet;

second temperature-sensing means for sensing the temperature ($T_e$) of air exiting the enclosure; and processing means, programmed with a user-prescribed relationship between the maximum allowable temperature difference $\Delta T_m$ between $T_i$ and $T_e$ versus $T_i$, for determining the difference between the actual temperature difference $\Delta T$ and the maximum allowable temperature difference $\Delta T_m$ corresponding to the current value of $T_i$ and for increasing the speed of the fan when the difference between the actual and maximum allowable temperature differences exceeds a predetermined tolerance.

7. The apparatus according to claim 6 wherein said processing means is further programmed with a user-prescribed relationship between fan speed and the minimum achievable temperature difference and wherein said fan controller further includes means coupled to each fan for sensing the fan speed to enable the processor means to determine if the actual temperature difference $\Delta T$ exceeds the minimum achievable temperature difference $\Delta T_a$, corresponding to the sensed speed, by a predetermined tolerance.

8. The apparatus according to claim 6 wherein each of the first and second temperature-sensing elements comprises a thermistor.

* * * * *